Oct. 19, 1926.

I. S. DEMENT 1,603,326

COMPUTING MACHINE

Filed July 3, 1903    12 Sheets-Sheet 1

WITNESSES:
Edward F. Daly
Wm. J. Dolan

INVENTOR
Isaac S. Dement,
BY
Kenyon & Kenyon
ATTORNEYS.

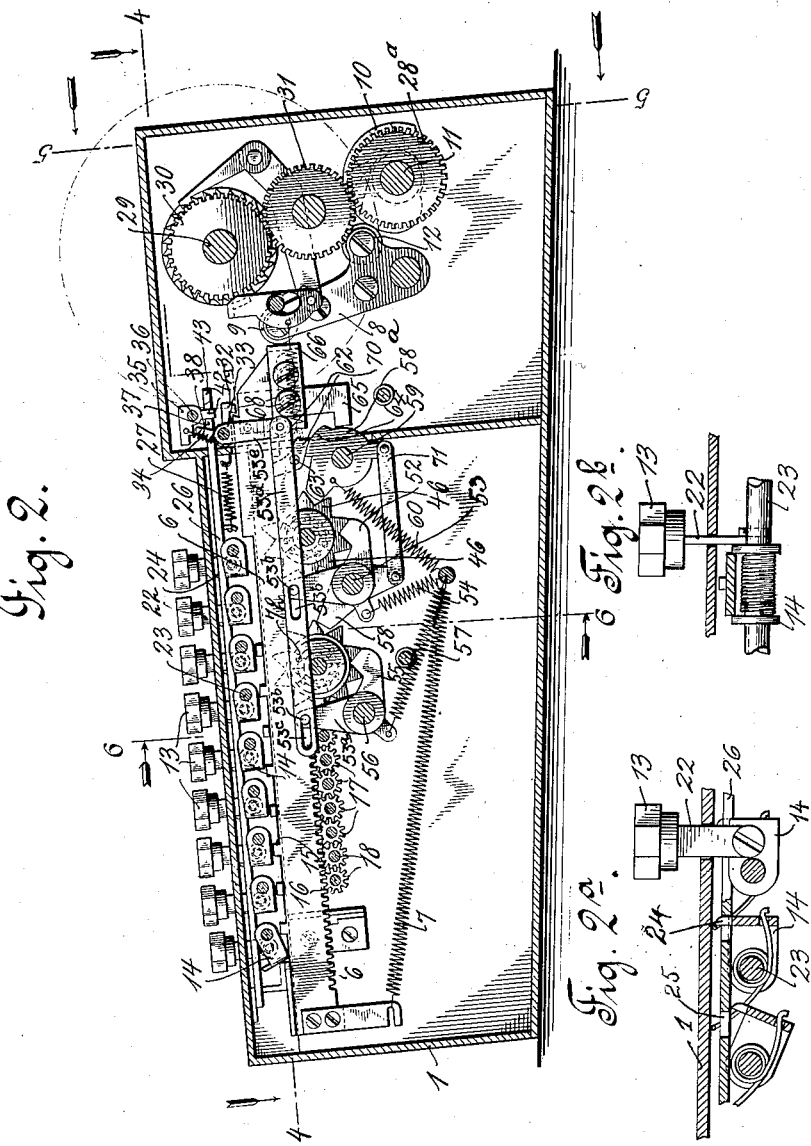

Oct. 19, 1926.
I. S. DEMENT
1,603,326
COMPUTING MACHINE
Filed July 3, 1903        12 Sheets-Sheet 3
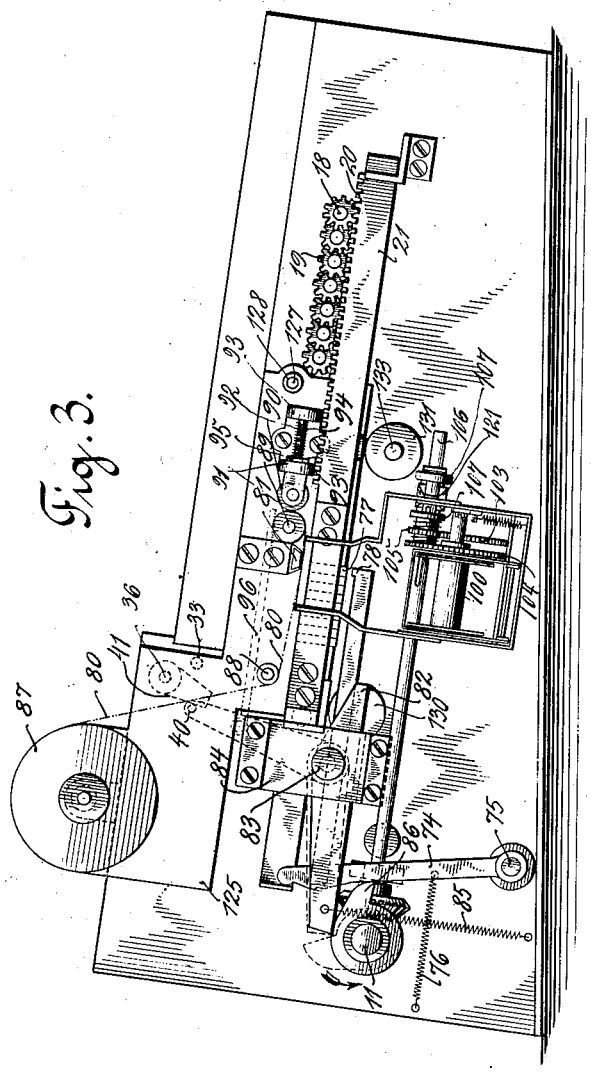

Oct. 19, 1926.

I. S. DEMENT

COMPUTING MACHINE

Filed July 3, 1903   12 Sheets-Sheet 7

1,603,326

Oct. 19, 1926.

I. S. DEMENT

COMPUTING MACHINE

Filed July 3, 1903    12 Sheets-Sheet 9

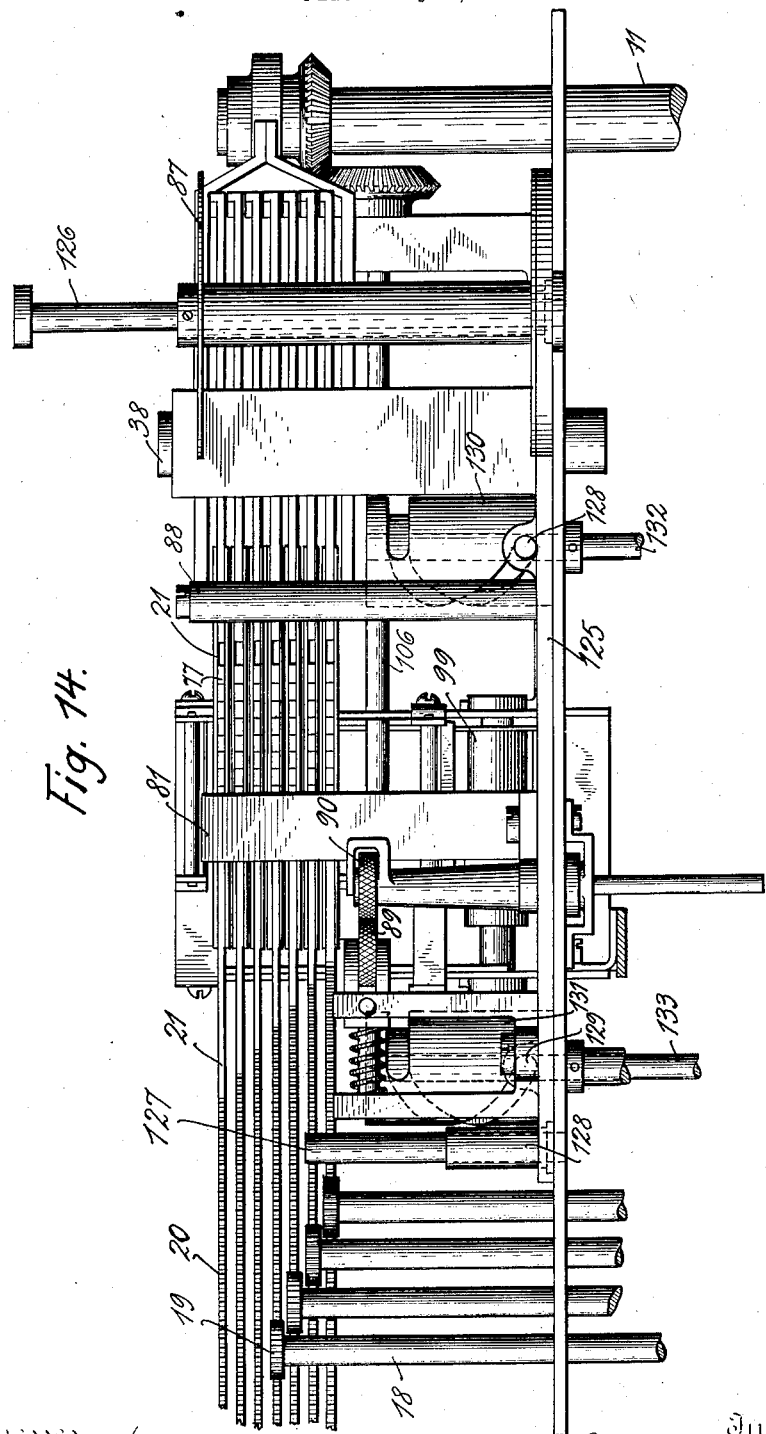

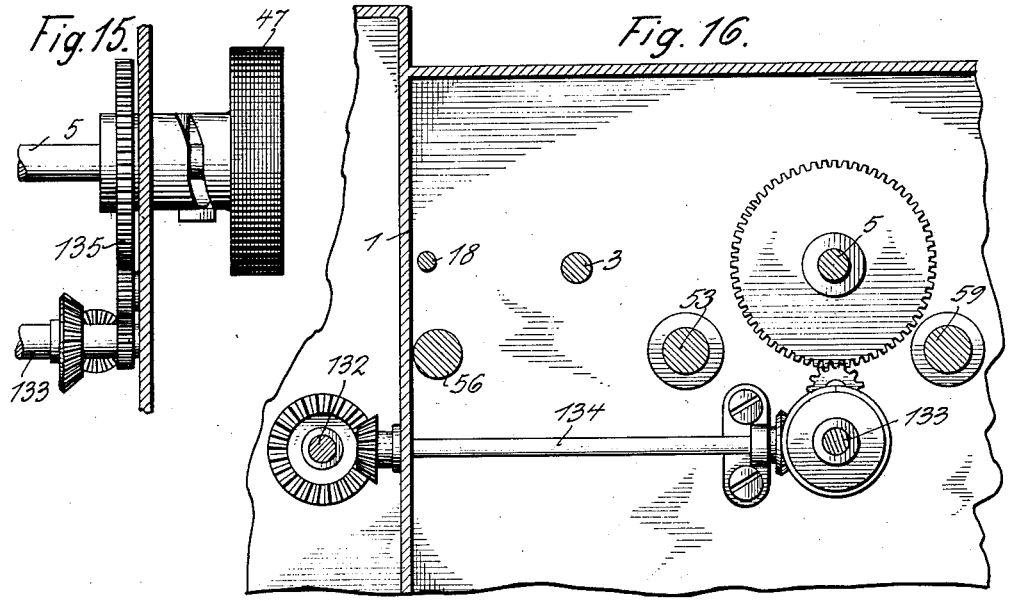
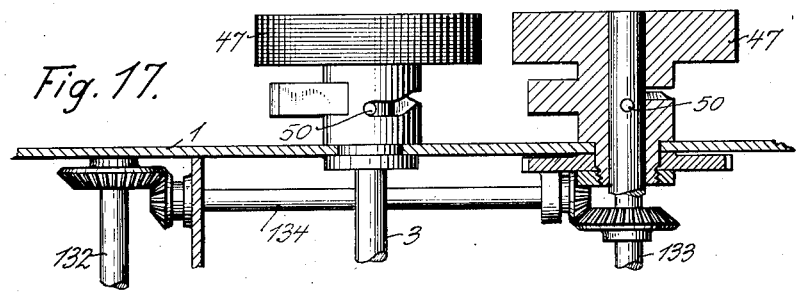
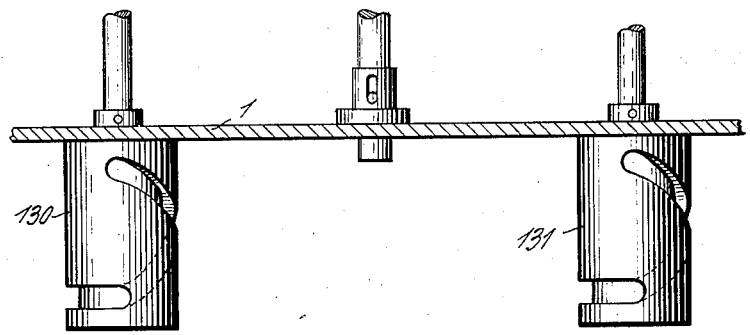

Oct. 19, 1926.
I. S. DEMENT
COMPUTING MACHINE
Filed July 3, 1903
1,603,326
12 Sheets-Sheet 12
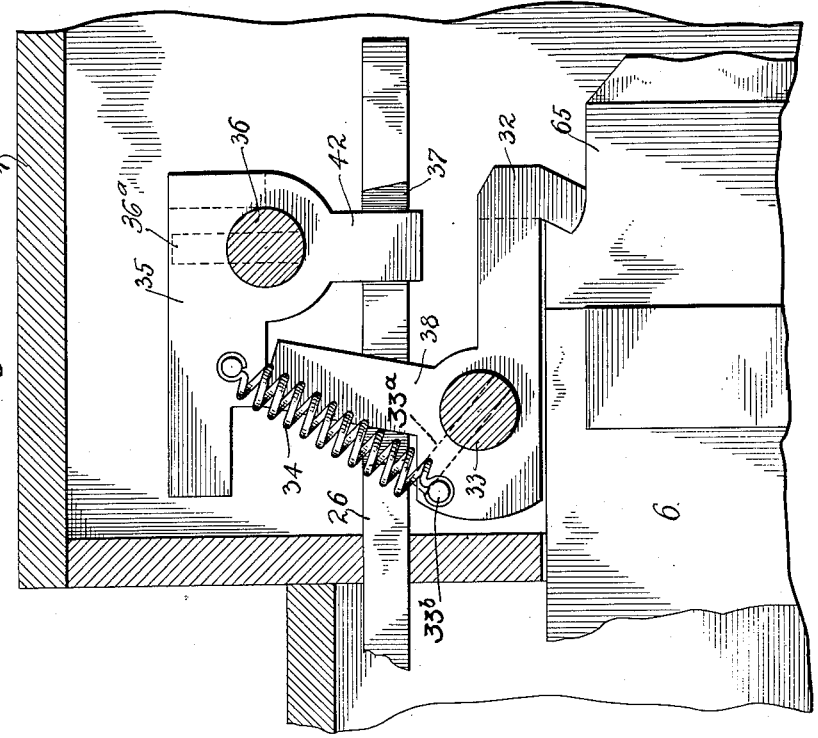
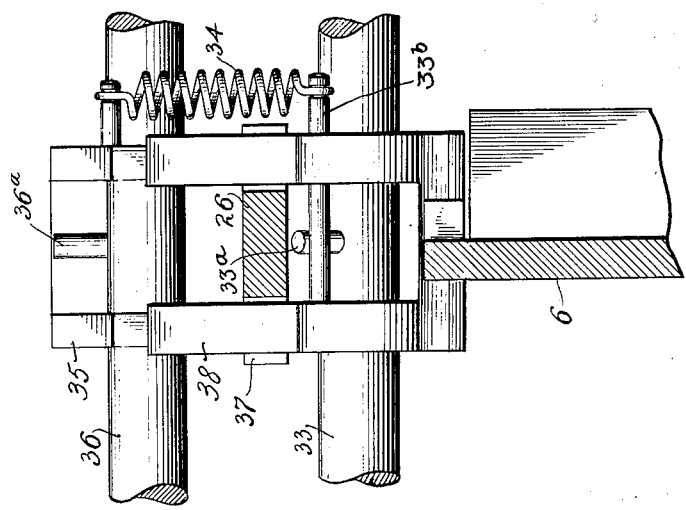
WITNESSES:
Edward F. Daly
Wm. J. Dolan
INVENTOR.
Isaac S. Dement,
BY Kenyon & Kenyon
his ATTORNEYS Patented Oct. 19, 1926.

1,603,326

UNITED STATES PATENT OFFICE.

ISAAC S. DEMENT, OF EAST ORANGE, NEW JERSEY, ASSIGNOR, BY MESNE ASSIGNMENTS, TO THE NATIONAL CASH REGISTER COMPANY, OF DAYTON, OHIO, A CORPORATION OF MARYLAND.

COMPUTING MACHINE.

Application filed July 3, 1903. Serial No. 164,214.

This invention relates to computing machines and more particularly to machines of the type in which a plurality of totalizers are employed.

The principal object of this invention is to provide an improved machine with a plurality of totalizers and a set of actuators common thereto with means for bringing any one of the totalizers and the actuators into cooperative relation.

Another object of this invention is to provide means for each totalizer constructed so that the totalizer may be disconnected from or connected to the actuators, the said means also controlling the totalizer for the purpose of setting type carriers for the printing of a total.

Another object of this invention is to construct a machine having a plurality of totalizers and in which an amount standing on one of the totalizers may be transferred by the machine to another adding the amount transferred to the amount previously standing on this other totalizer.

A further object is to construct a machine having the functions just mentioned in which provision is made for printing the amount transferred from one totalizer to another.

Another object of this invention is to provide printing mechanism having a wide record strip, with means for shifting the record strip relatively to the type carriers of the printing mechanism so that items entered in the various totalizers may be listed in separate columns upon the record strip.

A further object of this invention is to provide an improved form of transfer mechanism for the totalizers whereby the actuators are positively moved an additional step to effect the transfer.

With these and incidental objects in view the invention consists in certain novel features of construction and combinations of parts the essential elements of which are set forth in appended claims and a preferred form of embodiment of which is hereinafter shown with reference to the drawings which accompany and form part of this specification.

Figure 1:
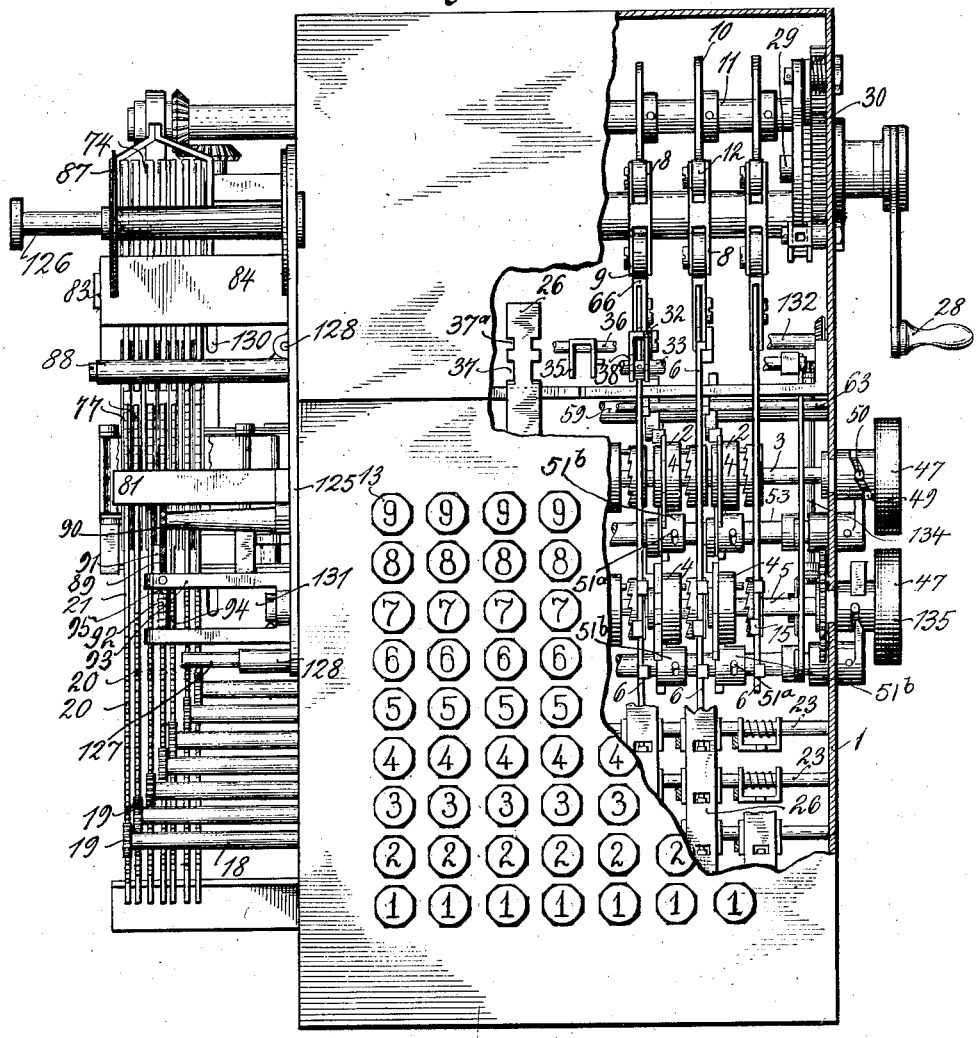
Figure 1A:
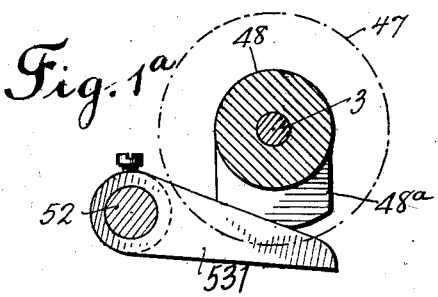
Figure 4:
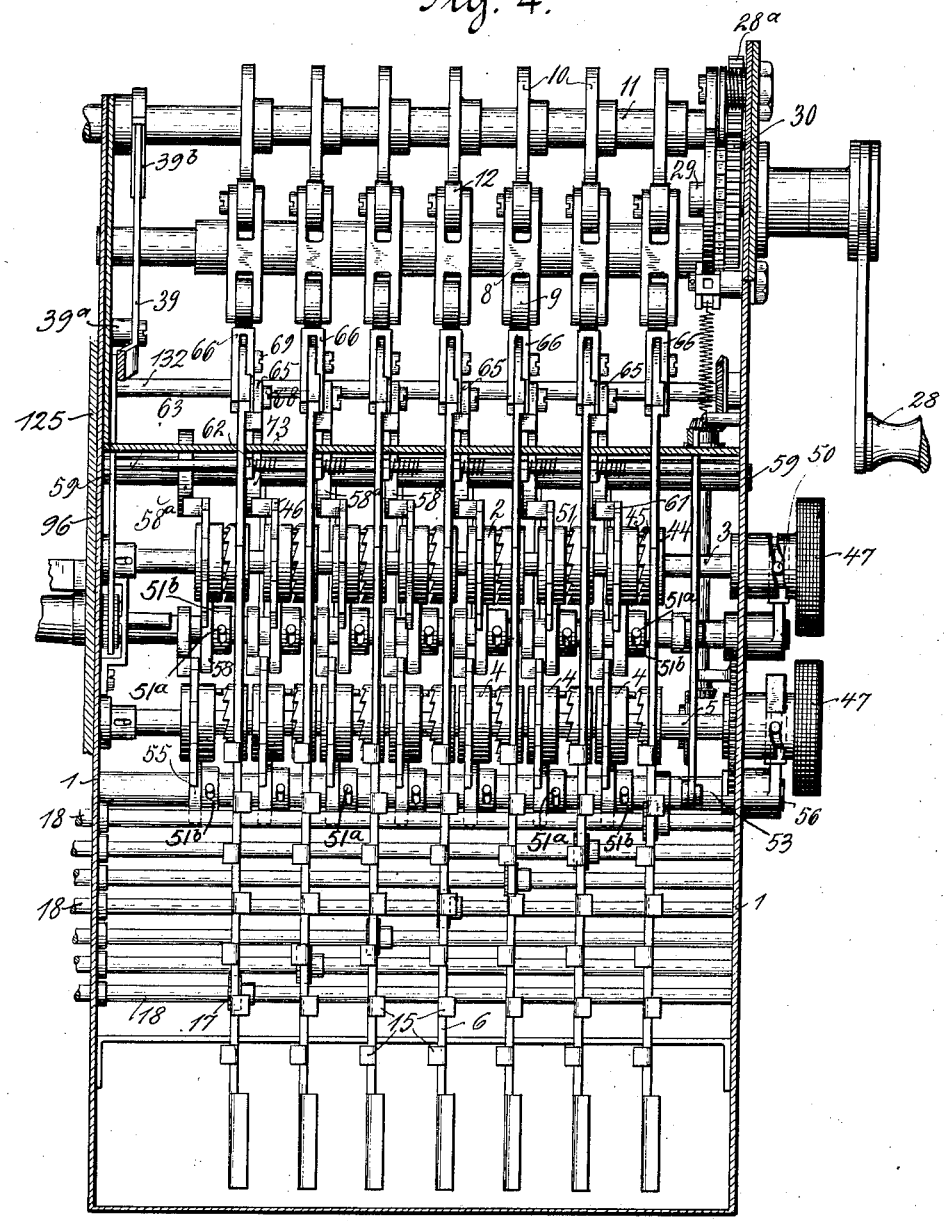
Figure 5:
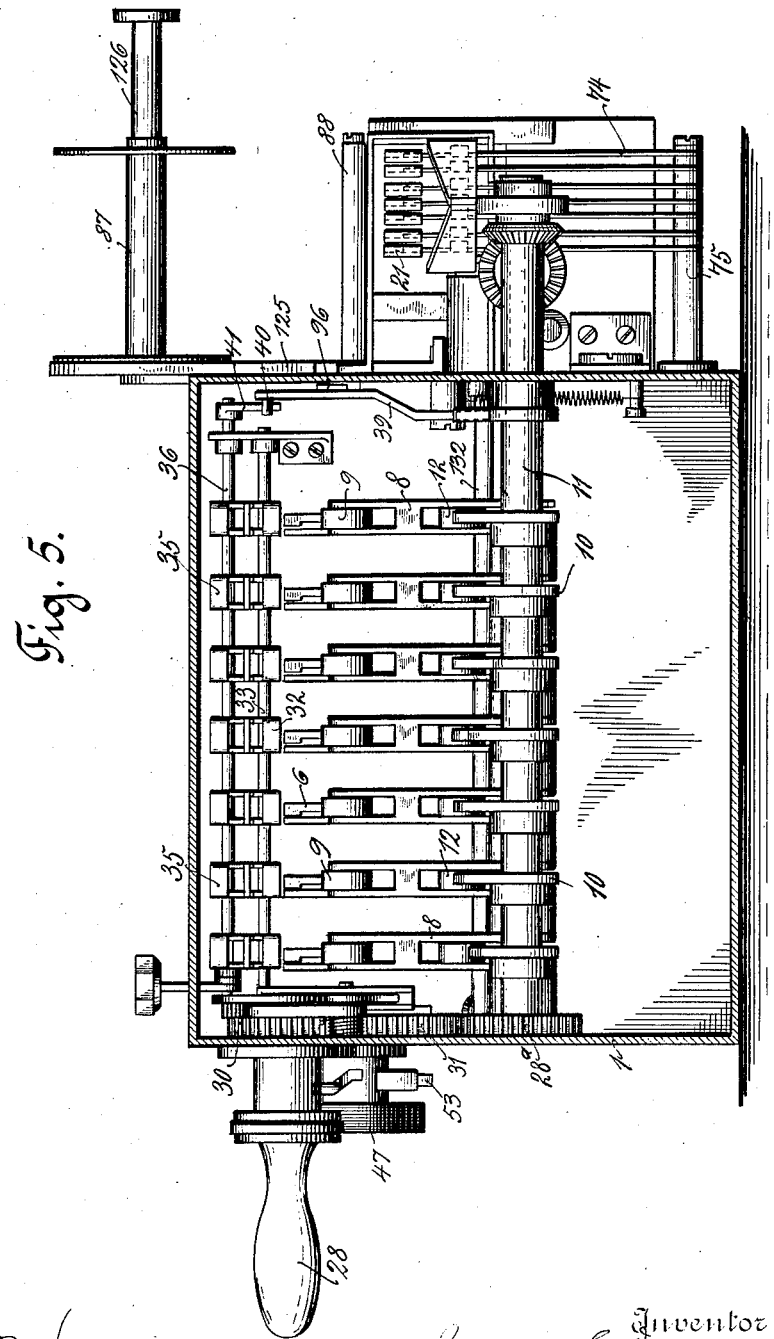
Figure 6:
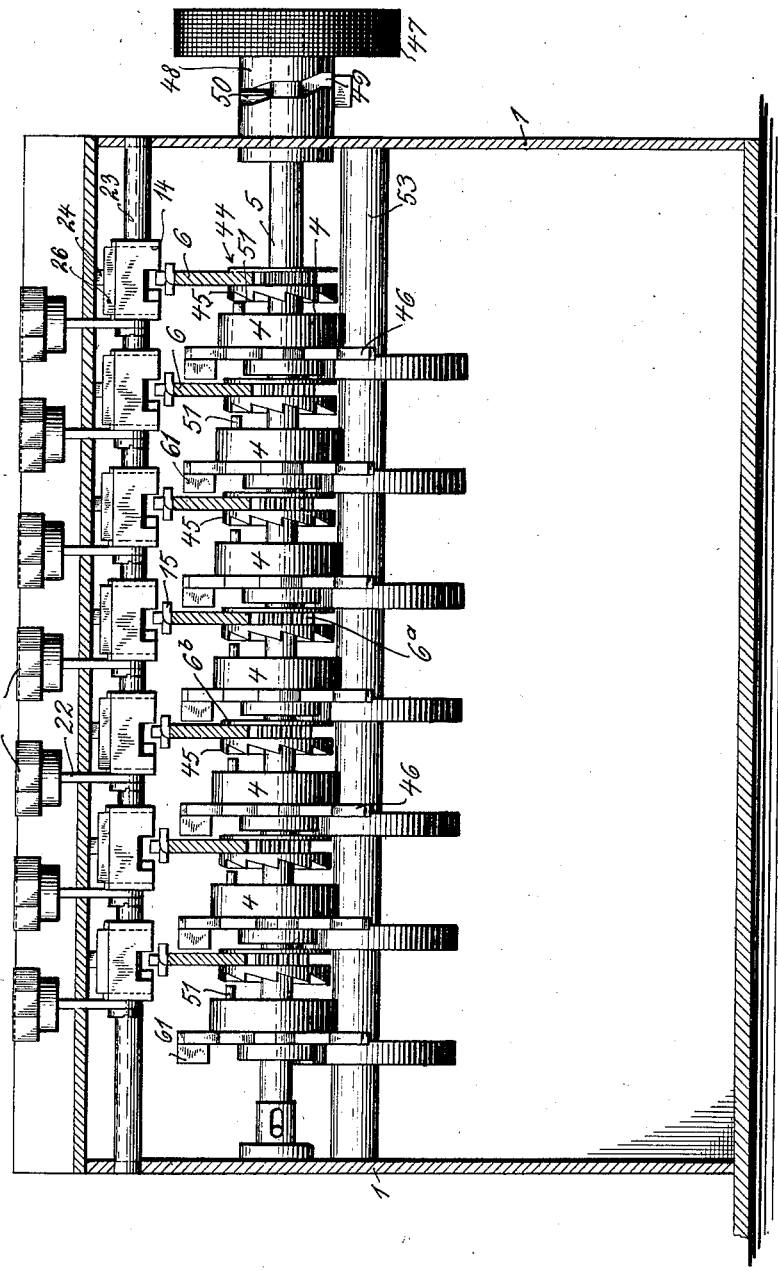
Figure 7:
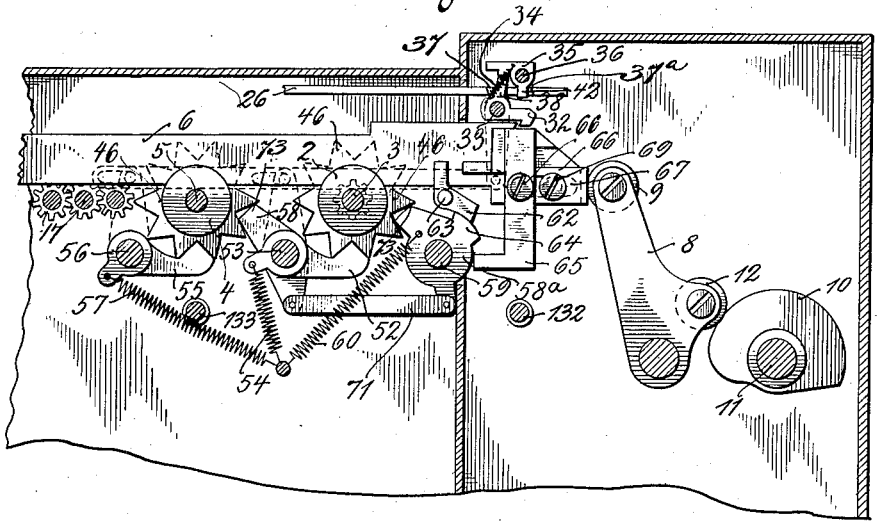
Figure 8:
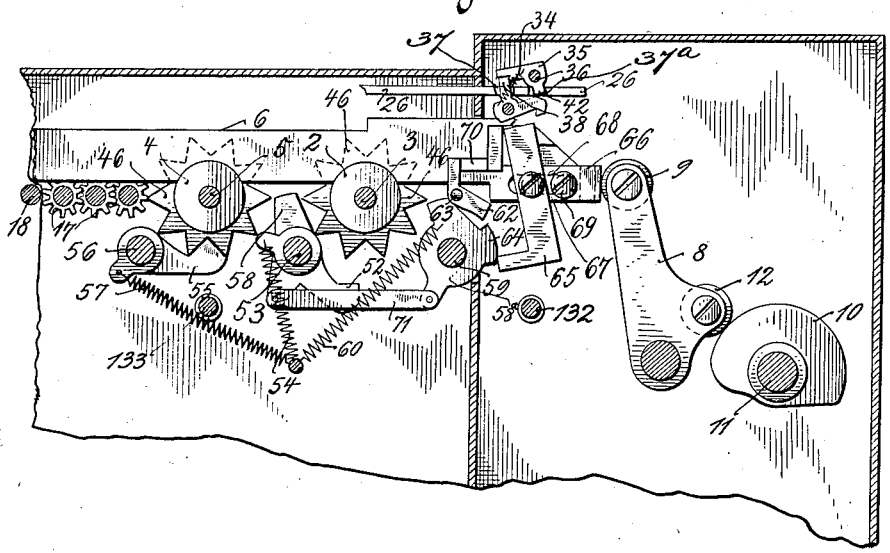
Figure 9:
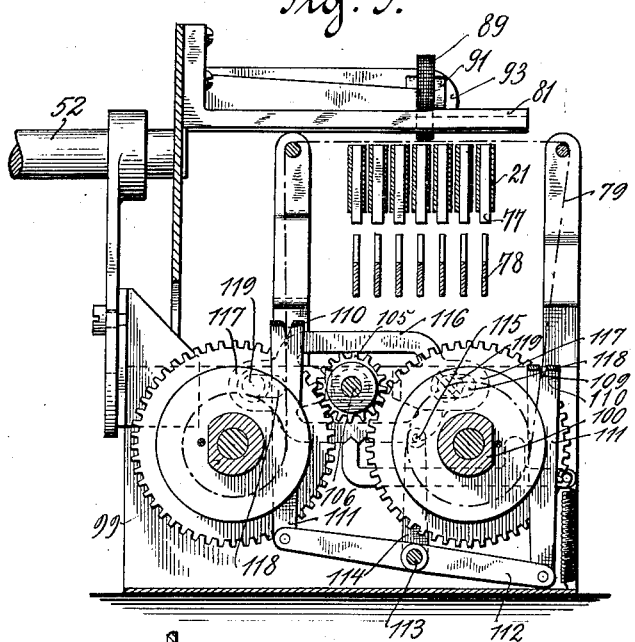
Figure 10:
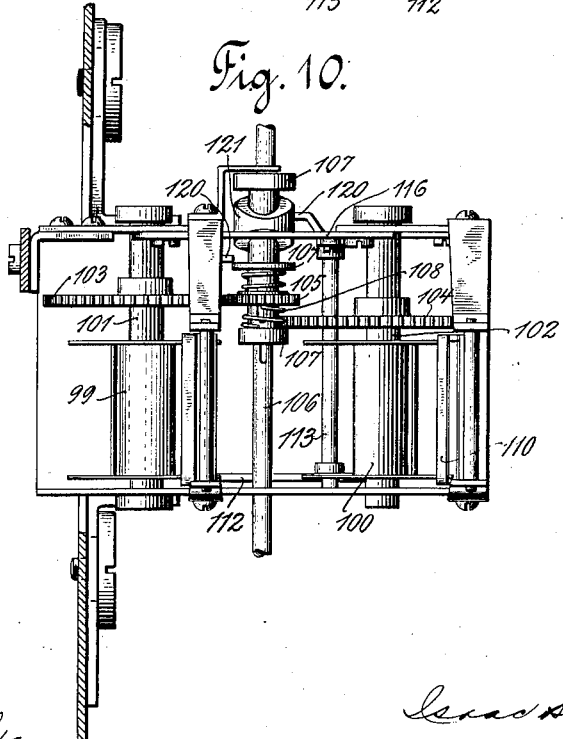
Figure 11:
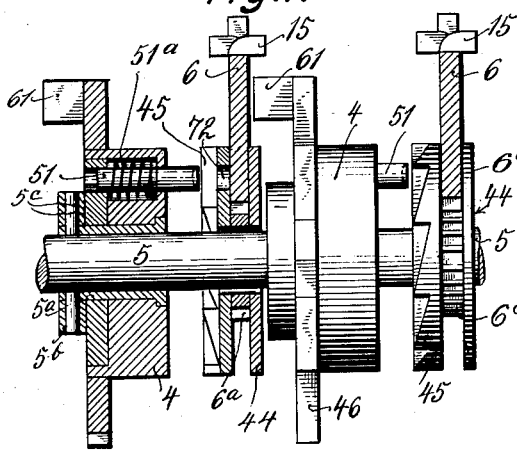
Figure 12:
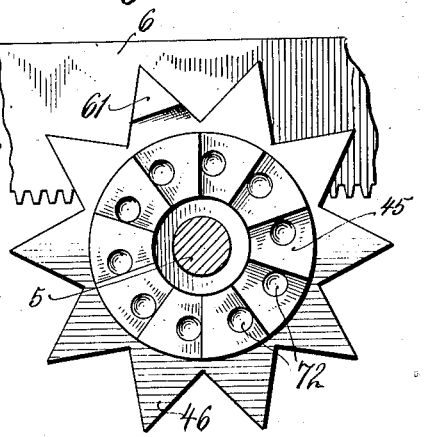
Figure 13:
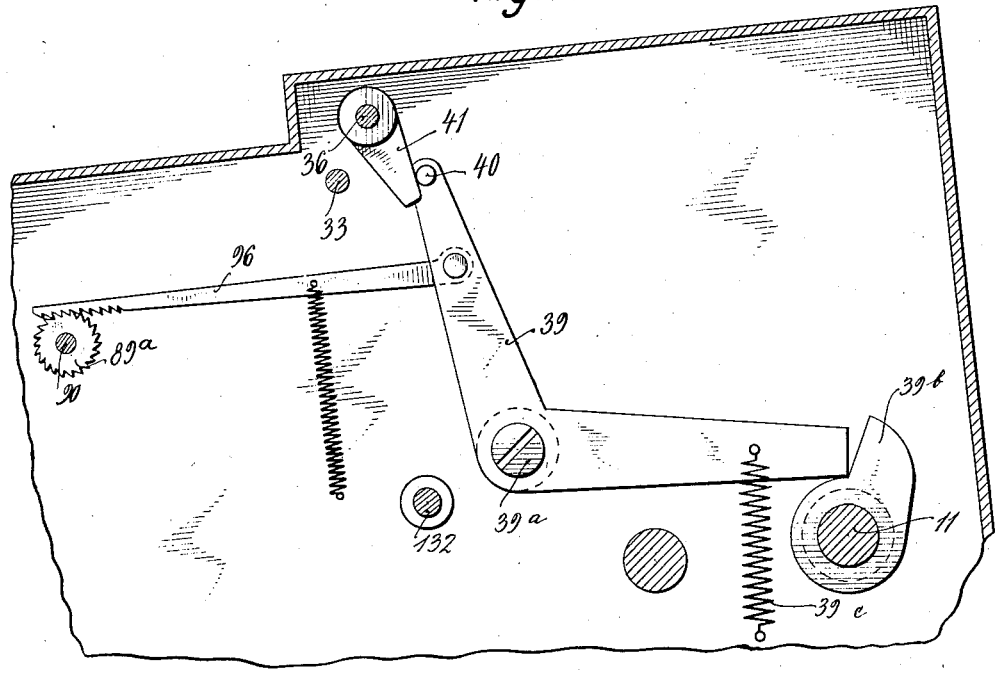

Fig. 1 is a plan view of an adding, totaling and printing machine embodying my invention with a portion of the upper casing broken away; Fig. 1ª is a sectional view of a detail; Fig. 2 is a side view of the same with the side casing removed; Figs. 2ª and 2ᵇ are sectional views of details; Fig. 3 is a side view of the same taken from the opposite side to that of Fig. 2 and showing in particular the printing mechanism; Fig. 4 is a horizontal section on the line 4—4 of Fig. 2; Fig. 5 is a rear view taken on the line 5—5 of Fig. 2, viewed as shown by the arrow; Fig. 6 is a section taken on the line 6—6 of Fig. 2 viewed as shown by the arrow; Figs. 7 and 8 are details of the carrying mechanism, and Figs. 9 and 10 are a side and plan view of the ribbon feed mechanism. Figs. 11 and 12 are respectively a side and front view of a detail; Fig. 13 is a side elevation of another detail; and Fig. 14 is a detail plan view of the printing device. Figs. 15 and 16 are sectional elevations, and Fig. 17 is a sectional plan of details of the printing device; and Figs. 18 and 19 are vertical sectional views illustrating a detail of the mechanism.

In the form of machine shown in the drawings I provide two sets of adding wheels separate and distinct from each other, either one of which can be thrown into operation whenever desired, and upon each of which separate and distinct amounts can be added. In this way the same machine may be used for keeping separate accounts, as, for example, one for amounts received and the other for amounts paid out. Also the amount standing on one totalizer can be transferred to, and added to the amount standing on, another totalizer. If desired, one or more additional sets of adding wheels can be added.

Means are also provided for taking the total of either of the sets of adding wheels at any time. These totals may be indicated in any desired way. I indicate them by printing them by suitable printing means. I also preferably print each number as it is added to either set of wheels.

1 is the casing of the machine; 2, 2 represent the adding wheels of one set loosely mounted upon shaft 3 but adapted to move with the shaft longitudinally; 4, 4 are the adding wheels of the second set similarly mounted upon a shaft 5, and any suitable operating means may be employed for moving the adding wheels. As shown these means consist of a series of reciprocating bars 6, 6 common to both of the sets of adding wheels and adapted to operate whichever set is operatively connected with them. These operating bars, through springs 7, tend to move to the rear of the machine and are positively withheld from such movement by a series of blocking levers 8 provided at their upper ends with rollers 9 bearing against the rear ends of the operating bars. These levers are held in their locking position by cams 10 on shaft 11, pressing against rollers 12 on the levers. In the operation of the machine these cams permit levers 8 to move to the rear allowing operating bars 6 to move in the same direction. During this rearward movement of the bars no effect is produced upon the adding wheels, but when the bars return in their forward movement pressed by the levers 8 the bars rotate whichever series of adding wheels is in operative connection with them. The extent of the reciprocating movement of the bars is determined by suitable number indicating means. In the machine shown the number indicating means consist of finger keys 13. These keys are arranged in the usual manner in a bank composed of different series representing different orders of values. Whenever a key is depressed it throws down a stop 14 into the path of a projection 15 on the corresponding bar 6, thus limiting the movement of the bar in the rearward direction. In the well known way keys of different values in a given order thus control the extent of rearward movement of the bar corresponding to that order, and in that way add upon the adding wheels according to the values of the keys depressed. Each operating bar is provided near its forward end and on its under side with a short rack 16 adapted to mesh with a gear 17 fast on a shaft 18, a separate gear and shaft being provided for each bar. Each of the shafts 18 is provided at its left-hand end as shown in Fig. 1 with another gear wheel 19 meshing with a rack 20 on the upper end of a type-bearing bar 21, a separate bar 21 being provided for each shaft. Each type-bearing bar carries a set of type bearing the figures 0 to 9 inclusive which, when a key is depressed, is correspondingly moved to indicate the value of the key, bringing upon the printing line the type representing that value. Suitable impression devices are provided so that each number added on the adding wheels will also be printed.

Devices are also provided whereby the total represented by either set of the adding wheels may be ascertained. In the best embodiment of my invention the totals are printed preferably by the same devices which print the numbers to be added. In accordance with the construction shown therefore the totaling device, as that term is used herein, consists of means whereby the control of the printing mechanism may be transferred from the number-indicating means upon keys 13 to one or the other of the sets of adding wheels. In accordance with this feature of the invention, the adding wheels are connected with the operating bars so that they move with the bars on the rearward movement of said bars, and limit the rearward movement of the bars in accordance with the respective positions of the adding wheels with relation to a predetermined point. In the embodiment of the invention illustrated the operating bars are normally controlled by the number-indicating means and operate to add on the adding wheels the numbers indicated on the keys and to operate the printing devices to print said numbers. When the totaling devices are operated, however, one set or the other of the adding wheels is rendered operative to control the operating bars and through them the printing mechanism, so that the totals are represented on the operative set of adding wheels. In accordance with the construction shown, the adding wheels are operated to add by one movement of the operating bars, and are rendered operative to print totals on the opposite movement of the operating bars.

It is immaterial to my invention which movement is employed for the adding and which for the totaling. In the device shown in the drawings the totaling is taken on the rearward movement of the bars, and the adding on the return or forward movement of the bars.

The construction is applicable to accumulate the totals of a series of items on either totalizer and transfer the total to the other totalizer. This may be done either by adding on the totalizer wheels 4 and then transferring the total to the totalizer wheels 2 or the reverse. Thus either of the totalizers may in a sense be considered a supplementary totalizer or accumulator as it serves to accumulate a series of totals transferred to it from the other totalizer. Thus, for example, the totals of a series of items added on the front totalizer 4 may be transferred to the rear or supplementary totalizer or accumulator 2. Moreover, either subtotals or grand totals may be printed from either of the totalizers at any time. To accomplish the printing of subtotals, the knobs on the totalizer shafts are set one at a time to total printing position and the machine then operated, the knob staying in the printing position during the entire operation of the machine. Such an operation serves to print a subtotal. If, however, a grand total is desired, the total printing knob is set to total printing position but at an intermediate portion of the operation the knob is restored to the ineffective position, thereby permitting the totalizer wheels to remain in their zero positions to which they have been restored.

I will now proceed to describe more in detail the different operations of the particular machine shown and its different parts.

The shank 22 of each key 13 is pivoted to a stop 14, and each row of the stops 14 corresponds to a transverse row of keys on a shaft 23 fixed in the frame of the machine. Each stop 14 is provided at its forward end with an upwardly projecting toe 24 (Fig. 2ª) which passes through an opening 25 in a locking bar 26. This bar is normally held in its rearward position by the spring 27, but when a key is depressed, toe 24 forces the bar forward, the bar springing backward over the toe and locking the key and stop in the downward position as shown at the left in Fig. 2. The operating bars are normally locked and the bar corresponding to each row of keys representing a different numerical order is released by the depression of any key in that row as hereinafter explained. Stops 15 are so arranged on each of the bars 6 that when the key of any row is depressed and the corresponding operating bar is released, it will move an extent commensurate with the value of the key depressed. As shown in Fig. 4 the stops 15 are preferably arranged on alternate sides of operating bar 6 for convenience.

After keys have been depressed representing the number which it is desired to add, crank handle 28 is turned a complete revolution. This turns shaft 29, on which it is mounted, and gear 30 fastened on said shaft. Gear 31 meshing with the latter drives gear 28ª and shaft 11, thus permitting the levers 8 and rollers 9 to move out of the way of the bars 6, permitting those of the bars that have been otherwise unlocked to move backward. In practice I prefer to provide an additional lock for each operating bar adapted to be unlocked whenever a key of the row corresponding with the bar is depressed. This lock is shown in Figs. 2, 7, 8 and 19, in 2, 7 and 19 in its locking position and in Fig. 8 in its unlocked position. It consists of a short bellcrank lever 32, one for each bar, mounted loosely on a shaft 33 and having its rear end projecting down over a lip on bar 6. It is held in this position by a spring 34, connecting it with an arm 35 of a bellcrank lever loosely mounted on a shaft 36. Shaft 36 is provided with a pin 36ª for each bellcrank lever 35. When shaft 36 is in its normal position, pin 36ª will allow bellcrank lever 35 a free downward movement to lock the bellcrank levers 32 in their upper position, as shown in Fig. 8. To return the bellcrank levers 32 to their operative position, shaft 36 with the pin 36ª is turned so that the pin 36ª moves the bellcrank lever 35 to release bellcrank levers 32 and allow them to assume their normal operative positions. Locking bars 26 are provided on their rearward ends with cut-out portions 37 and 37ª into which project the upward arms 38 of bellcrank levers 32 and the downward arms 42 of bellcrank lever 35. In order to bring a depressed key of any row back to its normal position, the locking bar 26 corresponding with each of those rows has to be moved forward so as to allow the locking toes 24, on the corresponding stops 14, to slip back into their respective openings in locking bars 26, thus allowing the keys to return to their normal position. This forward movement of the locking bars 26 is effected through the lower arms 42 of bellcrank levers 35. Shaft 36 is provided on its outer end with an arm 41, see Fig. 13, upon which bears a pin 40 mounted on bellcrank lever 39, pivoted to the casing by means of a stud 39ª, and acted upon by a cam 39ᵇ fixed on shaft 11. Bellcrank lever 39 is retained in its normal position by a spring 39ᶜ. Whenever shaft 11 is turned through the operation of the cranklever 28, cam 39ᵇ will rock bellcrank lever 39, forcing pin 40 against arm 41, turning shaft 36 and pins 36ª mounted thereon, taking with it bellcrank lever 35 so that its lower arm 42 engages with the projection provided on locking bar 26 between the cut-out positions 37 and 37ª and thus imparting the forward movement to locking bar 26, releasing at the same time bellcrank lever 32 so that the catch provided on it locks bars 6 in their normal position.

It will be seen that only those bars 6 can move backward which correspond with rows in which a key has been depressed. As the crank handle revolves, those bars move backward until they have reached the limit of their movement and are positively pushed forward by levers 8. As the crank handle is turned, the bars 6 move backward until they have reached their limits provided for them by the depression of their respective keys; as soon as all the bars have reached their respective limits of backward movement, the cams on shaft 11, to which motion is imparted through the turning of the crank handle, commence to force bars 6 through levers 8 to their normal forward position. The rearward movement of the bars 6 shown in drawings is preferably arranged in such a way that no movement is imparted to the adding wheels during its period. The turning of the adding wheels for the purpose of adding the amounts indicated by the depression of the respective keys is preferably attained through the movement of the bars on their return to their normal positions. Any suitable devices may be employed to accomplish this. Those shown consist of the following. On the shaft of each set of adding wheels I loosely mount a series of ratchet wheels 44, (Figs. 11 and 12) one for each operating bar, each operating bar having on its lower side teeth meshing with corresponding gear teeth provided on each of said ratchet wheels. Each ratchet wheel is provided on one face with ratchet teeth 45. Both sets of adding and totaling mechanisms are substantially the same in construction and a description of the details of one mechanism will therefore be sufficient. Referring to the set of adding wheels marked 4, it will be seen that each adding wheel consists of a wheel 4 provided with a star-shaped disk 46 with ten points, one of which points has an outwardly projecting lug 61. Each of these adding wheels is also provided with a sliding pin 51 mounted and projecting from the drum-shaped portion of adding wheel 4 on the side of the wheel opposite to that on which the star-shaped disk is mounted. Pin 51 is kept in its projecting position by a spring 51$^a$. All of these adding wheels are mounted rotatably on shaft 5 in such a manner that their longitudinal position on shaft 5 is fixed to the shaft by means of a bushing 5$^a$, collar 5$^b$, and pin 5$^c$, as shown in Fig. 11 of the drawings, thus permitting the wheel to freely rotate on the shaft, but being forced to move longitudinally with shaft 5. The ratchet wheels 44 are mounted on the same shaft 5 and the ratchet teeth 45 face the sides of the adding wheels from which pins 51 project. There are ten of the teeth 45 on each ratchet wheel, and said teeth are arranged to slip on the pins 51 when the ratchet wheels are turned in one direction and to engage with the pins 51 when the ratchet wheels are turned in the opposite direction. Each ratchet wheel 44 is provided with a gear 6$^a$ which meshes with the teeth of the lower side of the corresponding rack 6. On the opposite side of the gear 6$^a$ from the part of the ratchet wheels 44 having the teeth 45 said wheels are provided with plain disks 6$^b$ which form guides for the rack bars 6, preventing side movement of the ratchet wheels 44 whenever shaft 5 on which they are rotatably mounted is moved longitudinally. The position of the adding wheels 4 and the star-shaped disk 46 mounted thereon will change in relation to the position of the ratchet wheels 44 with every longitudinal movement of the shaft 5.

The longitudinal movement of shaft 5 is effected through a thumb screw 47 (Figs. 1, 6, 15 and 17) connected with the shaft in the following manner: The thumb screw 47 has a sleeve 48 fastened to it which is provided with a cam groove in which a pin fastened on shaft 5 is adapted to move. The end of sleeve 48 is turned down in order to form a shoulder and the thinner portion of the sleeve projects through a hole in the casing, having a disk fixed on its inwardly projecting end in order to prevent any side movement of the sleeve 48 and its thumb screw 47. If the thumb screw 47 is now turned, the pin 50 in the slot of its sleeve 48 has to follow the cam-shaped groove 49 and thereby will move shaft 5 longitudinally to the position controlled by the shape of the groove 49. When the thumb-screw is turned as shown at Fig. 6, shaft 5 and its adding wheels are thrown to the left so that the pin 51 projecting from the side of each adding wheel toward ratchet 45, is freed entirely from the ratchet. When the thumb-screw is turned so as to bring pin 50 to the middle portion of groove 49, each adding wheel is moved so that its pin 51 is adapted to engage with ratchet 45. In this position pin 51 being yieldingly mounted in adding wheel 4 will slide past ratchet 45, when the same is turned one way, and the ratchet will catch the pin, when turning in the other way, taking with it the adding wheel. The parts are so constructed that on the rearward movement of the operating bars, pin 51 and ratchet 45 will slip idly by each other, but on the forward movement the adding wheels will be moved in accordance with the movement of the bars and the value of the key depressed will be added on its adding wheel.

The same construction applies to each set of adding wheels and connections. For each adding wheel is provided a dog 52 (Figs. 7 and 8) loosely mounted on a shaft 53 and held by a spring 54 in engagement with the star wheel 46 of the adding wheel. This serves to prevent the adding wheel from moving except when actuated and prevents over-feeding. A similar dog 55 mounted on a shaft 56 and provided with a spring 57 is provided for each adding wheel of the second set.

Any suitable carrying mechanism may be employed for carrying from one wheel to the next higher wheel. That shown in the drawings is particularly illustrated in Figs. 2, 6, 7, and 8. Each adding wheel 4 has a lug 61 projecting from the side thereof, said lug being adapted to strike a piece 58 loosely mounted on the shaft 53, one piece 58 being provided for each of the adding wheels. Each of the pieces 58 is normally held in position for its stop 73 to be engaged by the corresponding lug 61 by means of a spring 60. Each of the pieces 58 is connected by link 71 to a corresponding piece 58$^a$ mounted on the shaft 59, said shaft 59 and pieces 58$^a$ mounted thereon being arranged in co-operative relation with the set of adding wheels 2. During the adding operation, whenever any adding wheel 2 has moved its full complement and reached the zero point, its tooth 61 strikes piece 58$^a$ of the next higher adding wheel underneath and forces it upward from the position shown in Fig. 7 toward that shown in Fig. 8 until a catch 62 pivoted on a rod 63 falls behind projection 64 provided on 58$^a$, and locks piece 58$^a$ on shaft 59 and with them the pieces 58 on shaft 53, in its upper position. The curved outer surface of projection 64 on piece 58$^a$ strikes against the bottom of a swinging piece 65 and forces it to the right as shown in Figs. 7 and 8. Swinging piece 65 is fastened to a sliding piece 66, forming a rearward extension of bar 6. The rear of bar 6 and of extension 66 are each provided with a groove 67 and pins 68 and 69, one secured to piece 65 and the other to extension 66, both passing through grooves 67 and serving as guides. When a projection 64 forces piece 65 outward, as shown in Fig. 8, extension 66 is pressed slightly to the right, having the effect of lengthening bar 6. This lengthening is so proportioned that when levers 8 force bar 6 forward, it will cause bar 6 to travel an additional distance forward equal to one tooth of the adding wheels. The adding wheel of the next higher order will thus add one unit more than it otherwise would. If that bar had not been operated at all, it would add one to its wheel. If it had been moved a distance corresponding to the three keys for example, it would add four to its adding wheel, and so on.

Before bar 6 reaches the end of its forward movement a projection 70 from the side of bar 6 will strike the upper end of catch 62 and release piece 58$^a$.

At this moment the members 65 will be pressing against the portions 64 of the 58$^a$ pieces which were moved and the restoration of the pieces to normal will be retarded until the beginning of the next operation when the pressure is relieved as soon as the cams 10 are turned.

By the above carrying means carrying is effected without in any way interfering with the adding operation.

When the second set of adding wheels is employed, I employ a similar piece 58 for each adding wheel, but these pieces are mounted on shaft 53. They are connected with pieces 58$^a$ by a link 71. This enables the same catch, frame and extension to carry to the next higher wheel of the second set in the same manner as the carrying is done for the first set.

As is customary in machines of this type it is necessary, before attempting the printing of a total or subtotal or the transferring of a total from one set of adding wheels to the other, to give the operating handle 28 an idle operation with no keys 13 depressed and with the knobs 47 in normal disconnecting position so as to insure that all parts are in normal position.

If it is desired at any time to take a total of the amounts represented by the addition of the adding wheels of either set, the thumb-screw 47 and the shaft of the set is moved into its third position, which will move the adding wheels still nearer to the ratchet wheels 44. In this condition pin 51 enters into one of the series of holes 72 (Figs. 11 and 12) provided in the ratchet disk so that adding wheel and ratchet wheel are firmly locked together. If the operating bars move backward under the above condition, they will rotate the adding wheels according to the extent of movement of the bars. In taking a total no keys whatever are depressed.

Upon the turning of either of the knobs 47 to its third position so as to connect the elements of the totalizer to the ratchel wheels 44, a lug 48$^a$ projecting from the sleeve 48 of the knob 47 will contact with one of the arms 531 (Fig. 1$^a$) which project from the shafts 53 and 56, depending on which knob is turned, and rock said arm and the shaft to which it is connected in a clockwise direction (Figs. 1$^a$ and 2). Each of these shafts 53 and 56 has secured thereto an upwardly extending arm 53$^a$ (Figs. 2 and 7) which is provided with a pin 53$^b$ extending from the upper end of said arm into an elongated slot 53$^c$ formed in a slide 53$^d$. This slide at its rear end is pivoted to an arm 53$^e$ which is secured to and projects downwardly from the rock shaft 33. This rock shaft 33, as shown in Figs. 18 and 19, has a series of pins 33$^a$ projecting therefrom, which pins normally contact with rods 33$^b$ supported by the catches 32. From this description it will be seen that when either the shaft 53 or 56 is rocked by the turning of one of the knobs 47, the pin 53$^b$ projecting from the arm 53$^a$ secured to the rock shaft will move the link 53$^d$ rearwardly, by which movement the shaft 33 will be rocked through the arm 53$^e$ so that pins 33$^a$ projecting from said shaft, by contacting with the rods 33$^d$, will rock the catches 32 in an anticlockwise direction and thereby release the actuating racks 6, so that the latter may be drawn rearwardly by the springs 7.

The rearward movement of each of the racks 6 in the totaling operation is limited by the extent of movement the adding wheel with which it cooperates is advanced from the zero position. As the adding wheel reaches zero position, the offsets 61 of the star wheels 46, carried by said adding wheels, will contact with the upper edge of the pieces 58 or 58$^a$, depending from which totalizer the total is to be recorded. The pieces 58 and 58$^a$ being connected by links 71 are prevented from turning in an anticlockwise direction about their shafts 53 and 56 by downward extensions of pieces 58$^a$ which normally contact with the partition of the frame work 1, as shown in Figs. 2 and 7.

When either the shaft 53 or 59 is rocked in a totaling operation, pins 51$^a$ (Figs. 1 and 4) projecting from said shaft will contact with the ends of elongated slots 51$^b$ formed in the hubs of the retaining pawls 52 and 55 and rock either set of said pawls, depending upon the shaft that is being rocked, from engagement with the star wheels 46 (Fig. 2) so that the rearward movement of the adding wheels, of which the star wheels are a part, will not be retarded by the retaining pawls.

Any adding wheel will, therefore, during the totaling movement, move only from the position it occupies back to the zero position; thus, if the wheel stood at 6, it will move six points; if it stood at three, it will move three points, and so on, each moving backward a distance commensurate with the condition of its adding wheel. Thus a total is taken of the said adding wheels. This can be indicated in any suitable way. I prefer to indicate it by printing the total through suitable printing devices. The connection with the printing devices is made through some gears 17, shafts 18, gears 19, racks 20, and type-bearing bars 21, the figures brought on the several bars on the adding line corresponding to the total of the set of adding wheels. These printing devices will be more fully explained hereinafter.

Either set of adding wheels can be rendered operative at will. For this purpose I provide two thumb-screws 47, one for each shaft. If it is desired to add on one set, its thumb-screw is turned to its appropriate position, and the thumb-screw on the other shaft is turned so as to wholly disconnect the adding wheels from the ratchet wheels. The ratchet wheels of the second set thus turn idly.

If it is desired to print a subtotal from either the front or rear accumulator, the knob 47 corresponding to the selected accumulator is moved to the total printing position. This movement serve to rock the arms 52 or 55 out of engagement with the star wheels of the selected accumulator, raise latches 32, and insert the pins 51 of the selected accumulator wheels into one of the holes 72 in the ratchet discs 44. Therefore the accumulator wheels and the ratchet discs are positively connected together. By an operation of the handle the racks 6 are all released and are permitted to move rearwardly, thus reversely rotating the accumulator wheels until these wheels reach their zero positions. At this time the transfer lugs 61 engage and lock against the transfer controlling stop arms, thus preventing further movement of the wheels and the racks 6. During the operation of the handle the printing hammers strike the type, thus causing an impression of the total to be taken on the record strip.

The return of the driving cams 10 to their normal positions will restore the racks 6 to their forward or normal positions, thus rotating the wheels as great extents as they were reversely rotated, whereby at the end of the operation they are left in their previous positions indicative of the total which has been printed therefrom.

If a grand total is to be printed, that is, if the accumulator is to be permitted to remain in its zero position at the end of the operation, the manipulation is the same as before until the handle has been moved sufficiently to permit the entire rearward movement of all the driving racks 6. Then the resetting of the controlling knob 47 to ineffective or disconnecting position will cause the pins 51 to move entirely out of connection with the ratchets 45. Then when the racks 6 are forced forward to their normal positions by the cams 10, the accumulator wheels will be permitted to remain in their zero positions, thus causing the printing of the so-called grand total.

If it is desired to transfer to one accumulator the total standing on another, the construction readily provides for this. It will be understood that the transfer may be made from either counter to the other but for convenience it will be described as occurring from the accumulator 4 to the accumulator 2.

Let us assume for the purpose of illustration that there is an amount appearing on both of the accumulators.

In order to accomplish the result of transferring from the accumulator 4 to the accumulator 2, the knob 47 of the forward accumulator (the one toward the operator) is adjusted to total printing position. Under this condition, upon an operation of the handle the racks 6 will move rearwardly until the forward accumulator wheels reach their zero positions and lock against the transfer stop arms 58. After the handle has been moved sufficiently to permit of the entire rearward movement of the driving racks 6, the operation is momentarily stopped. The knob 47 for the rear accumulator is then adjusted to total printing position so as to lock all of the rear accumulator wheels to the racks 6. The knob 47 for the forward accumulator is then turned to ineffective or disconnecting position which will completely disconnect the forward accumulator wheels from the racks 6. The operation of the handle is then completed and during the continued movement the racks 6 which have been moved will be restored to their forward normal positions thereby entering in the rear accumulator the amount which was removed from the forward accumulator. It will be obvious that as the forward accumulator was disconnected from the racks after the wheels of the forward accumulator had reached zero position, the forward accumulator will then be left at zero.

If any wheel of the rear accumulator is, during such an operation, standing at a position other than zero just prior to the time that the rear accumulator wheels are locked to the actuators 6, then upon the disconnecting of the forward accumulator wheels from the racks, after the forward wheels have reached zero, the racks 6 may receive an additional rearward movement, but as the rear accumulator wheels are then locked to the racks the said rear wheels will receive movement corresponding in extent to the movement of the racks rearward, so that the relation of the racks and wheels will not be disturbed and no mis-entry will occur because of this movement. If such an additional movement occurs, the amount removed from the rear accumulator wheels will be restored thereto when the racks are moved to their forward positions and in addition the rear accumulator wheels will receive the movement to be transferred to them from the forward accumulator wheels.

It might frequently happen that when a transfer of amounts takes place the addition of the amount on the forward accumulator to the amount already appearing on the rear accumulator would require one or more carrying operations between the several wheels of the rear accumulator. This operation may readily take place, in exactly the same way as in regular adding operations so that it is not deemed necessary here to discuss the manner in which the carrying mechanisms act.

When an operation of transferring an amount from one accumulator to the other has been completed, the knob 47 for the accumulator which received the amount transferred will then be set to a position of complete disconnection. If the next operation is to be an operation of printing the total from the accumulator which received the transferred amount, then an idle operation is required, as hereinbefore mentioned, which idle operation must always precede a total, subtotal or transfer total operation. If, however, the next succeeding operation is an operation of entering an item, the restoration of the 58ª pieces to normal position and the consequent restoration of the racks 6 from their extended forward positions to their normal zero position will take place automatically as soon as the pressure on the 58ª pieces by the members 65 is relieved when the cams 10 are rotated.

The printing devices are more especially illustrated in Figs. 1, 3 and 5. Each bar 21 is normally held in its backward position by the arms 8 and cams 10 of the corresponding bars 6 through the gears 17, shafts 18, gears 19, and racks 20. 77 are the type. As preferably constructed, they consist of loose type mounted loosely in bars 21. They are forced upward by the printing hammers 78, and of these I preferably provide one for each order of values. The type are forced upward by the hammers against the ink-ribbon 79 and paper 80 against a platen 81. The hammers 78 lie loosely upon an underlying lever 82 pivoted at 83 in side supports 84. Lever 82 is normally held with its forward end up by means of spring 85 which forces its rearward end against a cam 86 fixed on shaft 11. This shaft is rotated in the direction of the arrow shown in Fig. 3 and cam 86 lifts the rear end of lever 82, permitting it to fall sharply, thus throwing its forward end upward giving the printing hammer 78 a sharp blow which will force the type just then on the printing line against the ribbon and paper producing an impression. By making the hammer in two parts, one loosely supported on the other, and by making the part 78 individual for each type and arranging the type loose in the bars 21 so that each type can be driven upward, I am enabled to get clear, sharply defined printing of the numbers on the type.

The paper may be fed forward by any suitable means. It is fed from a roll 87 over idle roller 88, under platen 81 and upon roll 89, passing between the said roll and friction roll 90. The latter roll is mounted on a reciprocating frame 91 moving on a rod 92 supported in bearings 93. A spring 94 coiled around rod 92 and secured to a collar 95 of frame 91, keeps friction roll 90 in engagement with roll 89. The paper is fed by means of a ratchet rack on the under side of a bar 96, meshing with the ratchet teeth on a disk 89ª which is splined to the shaft of roll 89, Fig. 13, reciprocating motion being imparted to bar 96 from the rocking lever 39. For the purpose of enabling the paper to be shifted laterally so as to bring the right-hand part of the strip of paper over the type so that the detail and totals of numbers added on the set of adding wheels 4 may be printed in a separate column from the detail and totals of the numbers added on the set of wheels 2, the paper supporting and feeding mechanism is mounted on a frame which is movable toward and away from the side of the machine and this frame is so connected with the thumb-wheel 47 corresponding to the set of wheels 4 that, whenever that thumb-wheel is so shifted as to bring the set of adding wheels 4 into operation either to add or determine the total of the numbers added thereon. This frame and shifting mechanism is illustrated in detail in Figs. 14, 15, 16, and 17. In accordance with the particular construction shown, the frame 125 on which the paper supporting and shifting mechanism is mounted is arranged to slide laterally on a pair of studs, one of which 126 passes through a sleeve on which the paper roll 87 is mounted to loosely rotate, and the other of which 127 passes through a sleeve 128 fixed to the end of the frame 125 opposite the stud 126. This frame is provided with a pair of depending pins 128 and 129 which are adapted to engage in suitable grooves formed in the surfaces of a pair of cylinder cams 130 and 131. These cams are mounted on the outer ends of a pair of transverse shafts 132 and 133 which, as shown in Fig. 17, pass to the opposite side of the machine and are connected to rotate in unison by means of two pairs of bevel gears and a connecting shaft 134. The shaft 133 is geared to rotate in unison with the thumb-wheel 47 corresponding to the set of adding wheels 4 by means of a train of gears 135 clearly illustrated in Fig. 15. The grooves in the cams 130, 131 are so formed that when the thumb-wheel 47 is rotated to bring the adding wheels 4 into operation to add numbers, the frame 125 will have reached the outer limit of its movement and will remain in this position when the wheel 47 has been turned to effect the printing of a total appearing on the wheels 4, because of the neutral portion of the cams.

The ink ribbon may be fed by any suitable devices. That shown in the drawings is especially illustrated in more detail in Figs. 9 and 10. The inking ribbon is wound on spools 99 and 100, the shafts 101 and 102 of these spools being provided with gears 103 and 104, respectively. These gears are driven one at a time by a gear 105 mounted on a shaft 106. The gear 105 is mounted upon this shaft through the medium of a sleeve 107 free to slide longitudinally of shaft 106 and connected to it by spline and feather so as to rotate with it. Springs 108 mounted on each side of gear 105 keep that gear yieldingly in the middle of the sleeve. When gear 105 meshes with gear 103, the ink ribbon 79 is fed in one direction, and when gear 105 meshes with gear 104, it is fed in the reverse direction. This reversal of feed takes place automatically by means of the following mechanism. Near each end of the ink ribbon is provided a knot 109 which is shown at the right in Fig. 9. The ink ribbon passes from each spool up through a slot 110 in the upper end of a tilting frame 111 composed of two upright bars pivotally connected to a cross-bar 112. Cross-bar 112 is fast on a shaft 113. Fast to this same shaft is an upright arm 114 pivotally connected to a sliding frame 116. This frame is provided at each end with an ear 117, each of which ears has a groove 118 through which projects a pin 119 from the framework of the machine. The frame 116 is capable of a slight sliding movement on these pins. When the knot 109 reaches the groove 110, it pulls the tilting frame 111 up on that side, throwing arm 114 one way or the other, and carrying with it frame 116. Frame 116 has two projections 120, one projecting from one side of the frame, and the other from the other toward a double cam 121 carried on sliding frame 107. When frame 116 is thrown one way, one of these projections is in the path of the cam and adapted to engage with it, and the other is out of the path of the cam and vice versa. When one is thrown in and shaft 106 is rotated, the frame 107 is forced to one extremity of its travel and gear 105 engages with one of the gear wheels 103 or 104, and when the other projection 120 is thrown in and the first one out, the frame is forced to the other end of its travel and gear 105 then engages with the other of the gear wheels 103 or 104. In this way the direction of feed of the ink ribbon is automatically reversed when the ink ribbon reaches the end of its movement.

My improved carrying device is positively actuated both when it is moved into operative position ready for carrying and when it and its number are moved in the adding direction. This dispenses with springs, renders the operation more certain and reliable and less likely to get out of order.

My invention, in its broader aspects, is not limited to the precise construction shown or to any particular construction by which it may be carried into effect, as many changes may be made in the construction without departing from the main principles of my invention and without sacrificing its chief advantages.

What I claim as new and desire to secure by Letters Patent, is:

1. In a machine of the class described, the combination with type carriers for recording items and the total thereof, of adding devices for accumulating the total of the recorded items, and a manipulative device for determining whether an item or a total is to be recorded, the said manipulative device comprising a knob having a cam slot therein for the purpose specified.

2. In a machine of the class described; the combination of type carriers for recording items and the totals thereof; differentially movable elements controlling said type carriers; adding devices actuated by said elements; and a device having a plurality of positions of adjustment and adapted when set in one position to control the adding devices and type carriers to print the items and add them, and when set in another position to control the adding devices and type carriers so that items will be printed and not added, and when set in still another position to control the adding devices and type carriers to print the total under control of said adding devices.

3. In a machine of the class described; the combination of differentially movable elements; adding devices actuated thereby; type carriers connected to the differentially movable elements for recording items and the totals thereof; and a device having a plurality of positions of adjustment and adapted when set in one position to control the adding devices and type carriers to print the items and add them, and when set in another position to control the adding devices and type carriers so that the items will be printed and not added, and when set in still another position to control the adding devices and the elements so that the elements will reversely rotate the adding devices under the control thereof to position the type carriers for recording totals.

4. In a machine of the class described, the combination with reciprocatory differentially movable elements, of adding devices, a longitudinally movable shaft supporting said devices, type carriers connected to the differentially movable elements for recording items and the total thereof, and an adjustable device for shifting the shaft and forming a one way connection between the adding devices and the reciprocatory differential elements when it is desired to enter a recorded item on the adding devices, the said adjustable device being capable of shifting the shaft a greater extent so as positively to connect the adding devices and said elements in both directions of movement of the latter for the purpose of setting the type carriers to print a total.

5. In a machine of the class described, the combination with reciprocatory differentially movable elements, of adding devices, a laterally movable shaft supporting said devices, type carriers connected to the reciprocatory elements for recording items and the total thereof, and means for shifting said shaft and the adding devices mounted thereon different distances in the direction of their axes for the purpose of forming a one way connection or for positively connecting the adding devices and the reciprocatory differentially movable elements depending whether it is desired to enter an item on the adding devices or to control the type carriers in the recording of a total.

6. In a machine of the class described, the combination with a plurality of independently axially movable totalizers, of actuators common thereto, manipulative means for selecting said totalizers for operation, type carriers controlled by said actuators for printing upon a record strip in different columns, and means under control of said manipulative means for effecting relative movement between the type carriers and record strip when one of the totalizers is moved into cooperative relation with the actuators.

7. In a machine of the class described, the combination with a plurality of independently movable totalizers, of actuators common thereto, manipulative means for moving any desired totalizer into cooperative relation with the actuators, a printing mechanism including a movable paper carriage having a wide record strip and means under the control of said manipulative means for moving the paper carriage for the purpose of printing in different columns on the record strip when one of the totalizers is moved into cooperative relation with the actuators.

8. In a machine of the class described, the combination with a plurality of axially movable totalizers mounted independently of each other, of actuators common thereto, a manipulative device for each totalizer for shifting said totalizer into engagement with the actuators, a printing mechanism including a movable paper carriage having a wide record strip, and means for moving the paper carriage under the control of one of said manipulative devices for the purpose of determining the column to be printed in.

9. In a machine of the class described, the combination with a totalizer comprising a plurality of wheels, of an axially movable shaft supporting said wheels, reciprocating differentially movable devices mounted loosely on said shaft adjacent to the wheels, and means for shifting the shaft and wheels so as to connect the latter to the differentially movable devices in such a manner as to drive the wheels by said devices as the latter are moved in one direction.

10. In a machine of the class described, the combination with a totalizer comprising a plurality of wheels, of an axially movable shaft supporting said wheels, differentially movable devices mounted loosely on said shaft adjacent to the wheels, reciprocatory racks meshing with the movable devices, and a rotable knob mounted on the shaft for shifting the shaft and wheels so as to connect the latter to the differentially movable devices in such a manner as to drive the wheels by said devices as the latter are moved in one direction by the reciprocatory racks.

11. In a machine of the class described, the combination with a differentially movable element, of a series of keys, pivoted devices connected to the keys for arresting the movable element differentially, a spring operated detent constructed to be moved by any one of the pivoted devices upon the depressing of a key connected thereto and spring back into normal position upon fully depressing the key thereby latching the key and pivoted device connected thereto in operated position, and a latch for the differently movable element operated by the movement of the detent.

12. In a machine of the class described, the combination with a differentially movable element, of a series of keys, devices connected to the keys for arresting the movable element differentially, a spring operated detent constructed to be moved by any one of the pivoted devices upon the depressing of a key connected thereto and to spring back into normal position upon fully depressing the key, thereby latching the key and the pivoted device connected thereto in operated position, a latch for the differentially movable element operated by the movement of the detent, and a pawl for holding the latch in its operated position.

13. The combination of a plurality of adding wheels, a plurality of actuating means, one for each wheel, each adapted to have a reciprocating movement and arranged in moving one way to operate its wheel and in moving the other way not to operate it, a main operating mechanism for positively driving the actuating means during their movement in operative direction, a normally ineffective device intermediate said operating mechanism and each of said actuating means, and a carrying device for each adding wheel but the highest adapted, when its adding wheel has moved its complement, to render effective the device associated with the actuating means of the next higher order to cause it, in moving in its operative direction, to carry one to the corresponding wheel of such higher order, whereby, when any adding wheel has moved its full complement, it will carry one to the next higher adding wheel.

14. The combination of a plurality of adding wheels, a plurality of operating means, one for each wheel, each adapted to have a reciprocating movement and arranged in moving one way to operate its wheel and in moving the other way not to operate it, and a carrying device for each adding wheel but the highest adapted, when its adding wheel has moved its complement, to be moved into such position as to lengthen the operating means of the next higher order to cause it, in moving in its operative direction, to carry one to the corresponding wheel of such higher order, whereby, when any adding wheel has moved its full complement, it will carry one to the next higher adding wheel, and means for releasing the carrying device on the return movement of the operating means of the next higher order.

15. In a machine of the class described, the combination with a differentially movable element, of a series of keys, pivoted devices connected to the keys for arresting the movable element differentially, and a spring operated detent constructed to be moved by any one of the pivoted devices upon the depressing of a key connected thereto and spring back into normal position upon fully depressing the key thereby latching the depressed key and pivoted device connected thereto in operated position.

16. In a machine of the class described, the combination with a totalizer comprising a plurality of wheels, of a laterally movable shaft supporting said wheels, differentially movable devices carried by said shaft adjacent the wheels, and means for causing relative movement longitudinally of the shaft between the wheels to operatively connect or disconnect these wheels and devices.

17. In a calculating machine, the combination of a plurality of denominational rows of number keys, an actuator appropriate to each row of keys, a main operating mechanism, a paper carriage, a printing device controlled by said actuators, a plurality of sets of accumulating devices, said sets being bodily immovable with relation to each other in a direction at an angle to their axes, and means operating upon an operation of the main operating mechanism to cause a number set up on the number keys to be added in one set of accumulating devices and to be printed in one column or to cause said number set up to be added in another set of accumulating devices and to be printed in another column.

18. In a machine of the class described, the combination of a plurality of totalizers, actuators common to all of said totalizers denominational rows of number keys for controlling said actuators to enter items in any desired totalizer, printing means common to all of said totalizers for printing the items and the total of items entered in any desired one of said totalizers, and means for selecting a totalizer for a total printing operation.

19. In a calculating machine, the combination of a plurality of sets of accumulators, printing mechanism common to a plurality of said sets of accumulators for printing items accumulated on each of said sets of accumulators, denominational rows of number keys common to a plurality of said sets of accumulators for determining items to be accumulated on each set of the plurality of said sets of accumulators and printed by said printing mechanism, means for selecting any desired one of said accumulators to receive the entry of items, and a carriage comprising means for supporting and backing a record sheet and operable for moving said record sheet relative to said printing mechanism to a plurality of columnar print-receiving positions.

20. In a calculating machine, the combination of a plurality of sets of accumulators, printing mechanism common to a plurality of said sets of accumulators for printing items accumulated on each of said sets, denominational rows of number keys common to a plurality of said sets of accumulators and to said printing mechanism for determining items to be accumulated on each of such sets and printed by said printing mechanism, means for selecting any desired one of said sets of accumulators to receive the entry of an item, and a carriage adapted to carry a record sheet and move the same transversely of said printing mechanism whereby items related to one of said sets of accumulators may be printed in one column, and items related to another set of said sets of accumulators may be printed in another column.

21. In a machine of the class described, the combination of the main operating mechanism, a plurality of totalizers, a series of actuators common thereto, for actuating said totalizers to add items therein and take totals therefrom, item entering means arranged in groups, each group appropriate to one of said actuators, and operable as a preliminary to an operation of the main operating mechanism, to predetermine the items to be entered in the totalizers, printing elements associated with said actuators for printing items and totals of items, means for supporting record material in a position adjacent to said printing elements, to receive the entries of items and totals upon said record material in columns appropriate to the totalizer actuated, and a plurality of manipulative devices, one for each totalizer, and operable as a preliminary to an operation of the main operating mechanism, to determine the totalizer to be actuated and the column to receive the entry in both item entering and total printing operations.

22. The combination of a set of adding wheels, a shaft carrying said wheels, the shaft and wheels having movement together longitudinally, operating bars one for each adding wheel, a disk for each operating bar loosely mounted on said shaft the shaft and disk having relative longitudinal movement, each wheel and its corresponding disk being provided with a series of holes in one of the parts and a projecting pin in the other adapted to engage with each other to lock the disk and wheel together when the shaft is moved longitudinally in one direction and to disconnect them when the shaft is moved longitudinally in the other direction.

23. In a machine of the class described, the combination of a plurality of series of depressible amount keys, a single series of racks controlled by said keys, a plurality of series of totalizer wheels operated by the racks, a series of transfer devices associated with each series of wheels driving means for positively moving the series of racks to add upon the totalizers amounts according to the keys depressed, means intermediate the racks and the driving means and connections between the transfer devices of each set whereby said intermediate means may be controlled by either of said series of transfer devices so that the driving means will move the racks an additional step when either of the transfer devices is operated.

24. In a machine of the class described, the combination of a plurality of totalizers, common actuators therefor, a series of transfer elements for each totalizer, and connections between the elements of like denominational order whereby movement of either element effects transfer operation.

25. In a machine of the class described, the combination of a series of racks, a series of keys controlling the racks, two totalizers, two transfer devices, means positively connecting the transfer devices, driving means for the racks, and means intermediate the driving means and the racks and adapted to be controlled by the transfer devices of either set to permit the driving means to move the racks an additional step.

In testimony whereof, I have signed my name to this specification.

ISAAC S. DEMENT.